Patented May 19, 1925.

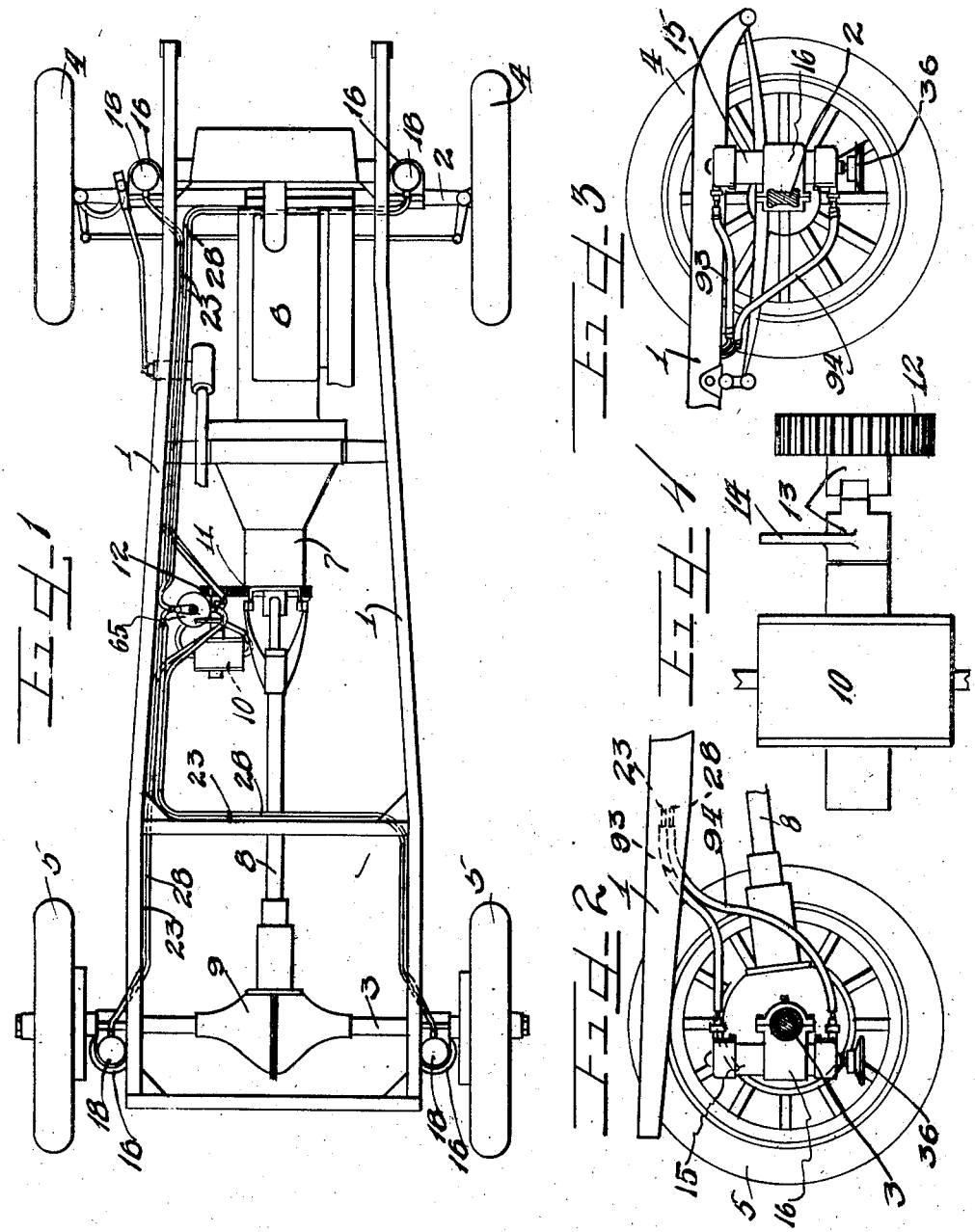

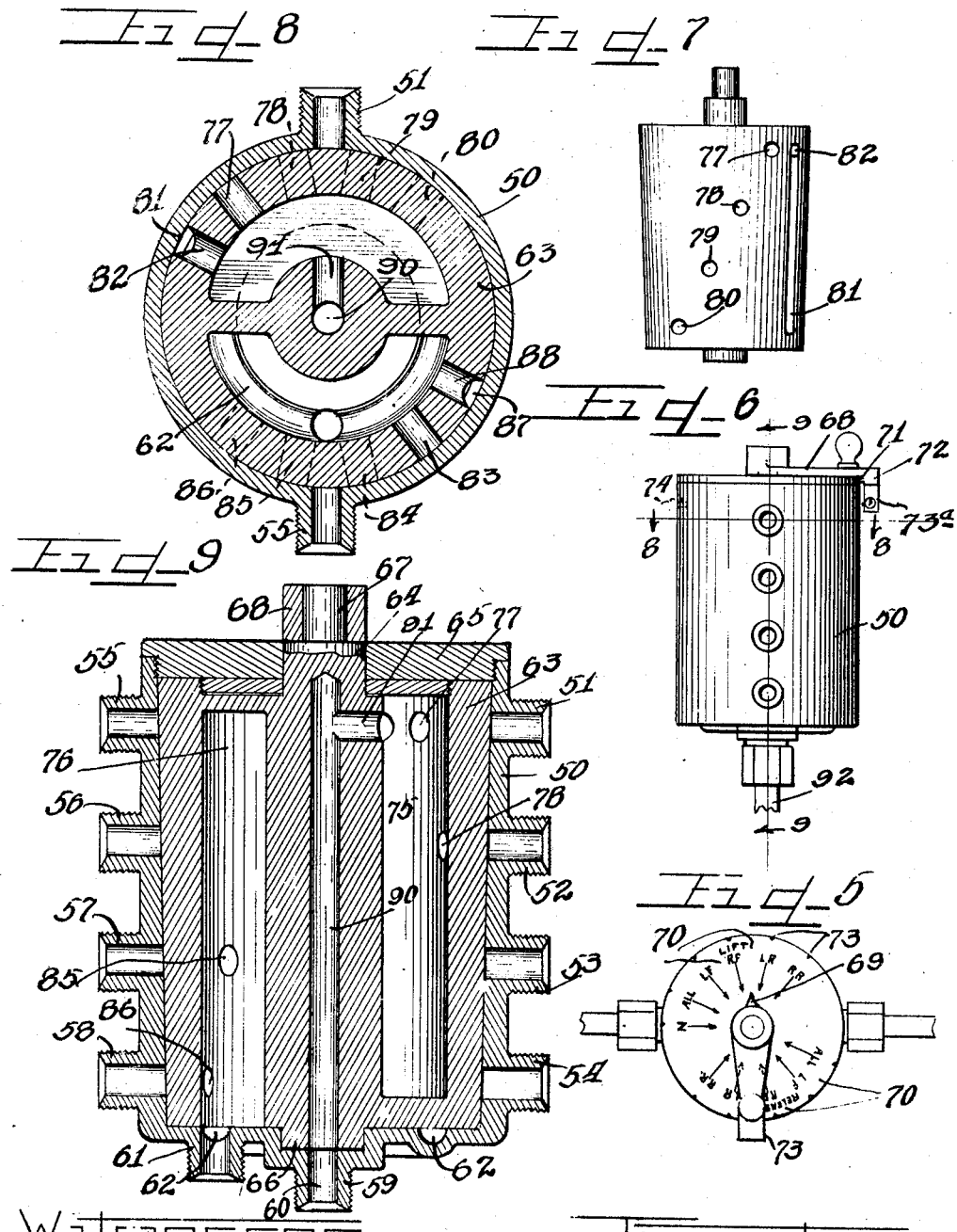

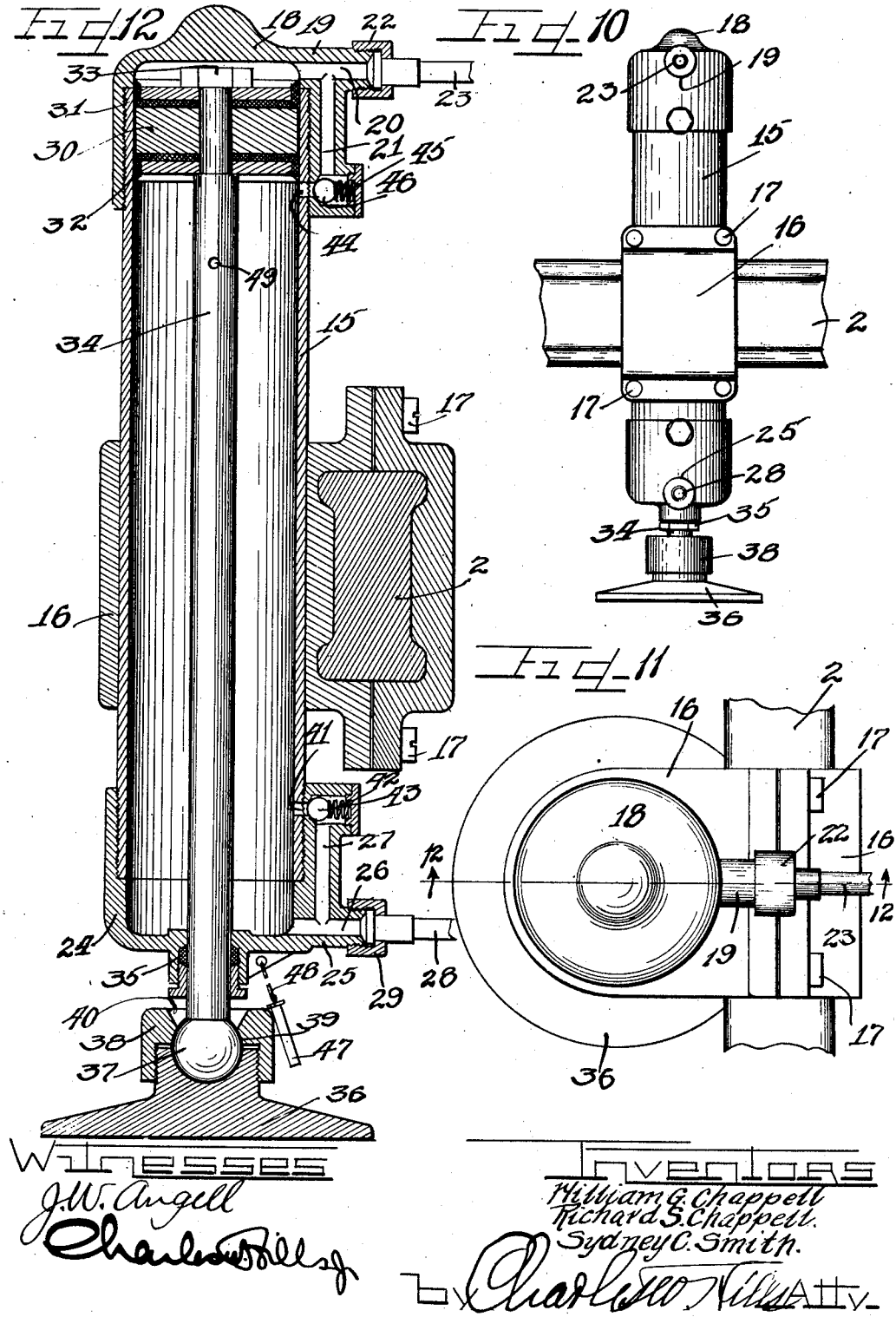

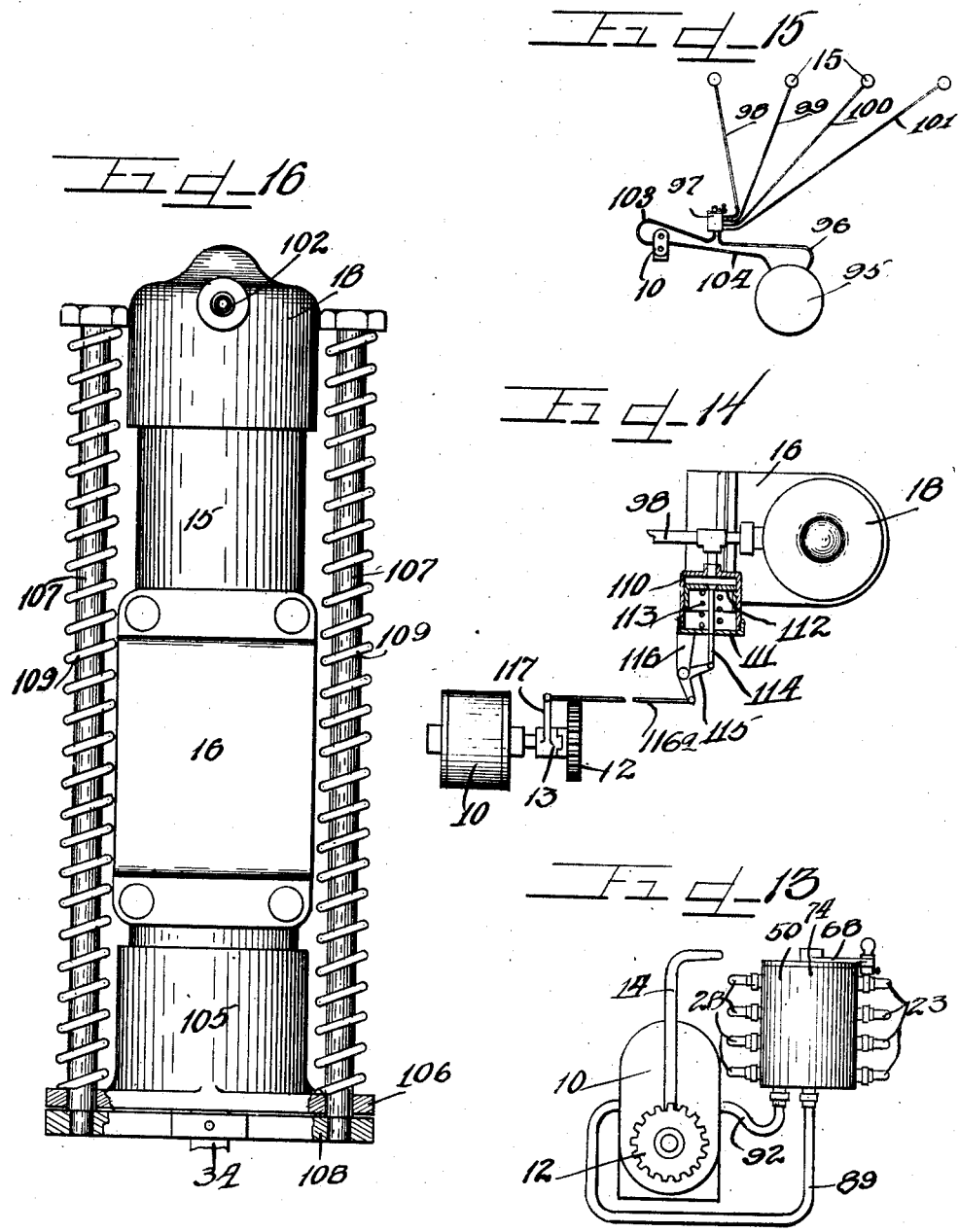

1,538,167

UNITED STATES PATENT OFFICE.

WILLIAM G. CHAPPELL, RICHARD S. CHAPPELL, AND SYDNEY C. SMITH, OF DETROIT, MICHIGAN.

HYDRAULIC-JACK SYSTEM.

Application filed March 11, 1922. Serial No. 542,839.

*To all whom it may concern:*

Be it known that we, WILLIAM G. CHAPPELL, a British subject, RICHARD S. CHAPPELL, a citizen of the United States, and SYDNEY C. SMITH, a British subject, and residents of the city of Detroit, in the county of Wayne and State of Michigan, have invented certain new and useful Improvements in a Hydraulic-Jack System; and we do hereby declare that the following is a full, clear, and exact description of the same, reference being had to the accompanying drawings, and to the numerals of reference marked thereon, which form a part of this specification.

This invention relates to a hydraulic jack system and particularly to an installation which is adapted to be mounted on a vehicle to raise the wheels thereof from a supporting surface.

Considerable inconvenience is experienced in the use of the ordinary portable manually operated jack on account of the difficulty of properly positioning the same for use, and also because of the labor attendant upon lifting of the vehicle therewith. Because of these difficulties, vehicles are ordinarily left standing with the wheels contacting the supporting surface, thereby occasioning deterioration of the tires, especially in cases where rubber tires are employed. It is also an unpleasant and often a difficult task to get the ordinary portable jack underneath the vehicle axle, especially when the vehicle wheels become mired.

It is an object therefore of the present invention to provide an installation which will overcome the above and various other difficulties, and which at the same time may be constructed and installed at a relatively small expense.

It is another object of this invention to provide a system of jacks or elevating mechanisms which are mounted on a motor vehicle and operated by the source of power thereof.

It is a further object of this invention to provide a hydraulic jack system which is adapted to be installed on a motor vehicle and controlled from the driver's seat.

Another object of this invention comprises the provision of an installation of the class described which is adapted to simultaneously or selectively raise the vehicle wheels.

It is also an object of this invention to provide a hydraulic jack installation embodying auxiliary means for maintaining the jacks in extended position.

It is a further object of this invention to provide an installation of the class described embodying locking means for maintaining the jacks in extended position.

It is an important object of this invention to provide a hydraulic jack installation which may be installed on existing types of motor vehicles or embodied as an integral part of motor vehicles during the construction thereof.

Other and further important objects of this invention will be apparent from the disclosures in the specification and the accompanying drawings.

The invention (in a preferred form) is illustrated on the drawings and hereinafter more fully described.

On the drawings:

Figure 1 is a plan view of a motor vehicle chassis showing a system embodying the present invention installed thereon.

Figure 2 is a fragmentary inside elevation, with parts in section, of the rear of the vehicle chassis, showing a portion of the installation of this invention.

Figure 3 is a fragmentary inside elevation of the front of the vehicle chassis showing a portion of the installation of this invention.

Figure 4 is a fragmentary elevation of the operating pump and the driving connection thereto.

Figure 5 is a fragmentary top plan view of the control mechanism.

Figure 6 is a fragmentary side elevation of the control valve mechanism.

Figure 7 is an elevation of the inside portion of the control valve.

Figure 8 is an enlarged section on the line 8—8 of Figure 6.

Figure 9 is an enlarged section on the line 9—9 of Figure 6.

Figure 10 is an enlarged fragmentary elevation showing one of the jacks attached to the front axle of the vehicle.

Figure 11 is an enlarged fragmentary plan view of the jack shown in Figure 10.

Figure 12, is a fragmentary section on the line 12—12 of Figure 11, with parts in elevation.

Figure 13 is a diagrammatic side elevation of the control mechanism.

Figure 14 is a diagrammatic view, partly in elevation and partly in section, showing a release device for a modified system.

Figure 15 is a diagrammatic view of a modified form of installation.

Figure 16 is an enlarged fragmentary elevation, with parts in section, of a modified form of jack.

As shown on the drawings:

The reference numeral 1 indicates a standard motor vehicle chassis frame which is provided with the usual front and rear axles 2 and 3 respectively, on which front and rear wheels 4 and 5 are mounted. A usual power unit 6 is provided which drives the vehicle through a transmission mechanism 7, a drive shaft 8 and the usual differential mechanism 9. The source of power for operating the hydraulic jack installation of this invention is preferably taken from the transmission mechanism 7 and comprises a pump 10 of any suitable construction which is driven from a gear 11 which is operatively connected to a countershaft in the transmission mechanism and which meshes with a gear 12 which is adapted to be operatively connected with the pump 10 by means of a clutch 13 which is engaged and disengaged by means of a lever 14. Said lever 14 preferably extends upwardly from the clutch 13 through the floor boards of the vehicle to a position adjacent the driver's seat, whereby the pump may be conveniently connected for operation or disconnected by the driver of the vehicle.

The jacks or lifting units by which the vehicle wheels are raised from the supporting surface will now be described. Said jacks each consist of a cylinder 15 which has brazed or otherwise secured to its outside near the central portion thereof a clamping device 16 whereby it may be secured to the vehicle axle 2 or 3, said clamping devices being of a proper form to tightly engage around said axles as shown in Figures 2, 3, 10, 11 and 12 and being secured together by means of suitable screws or bolts 17. Said clamping portions 16 are so positioned that the upper ends of the cylinders 15 are at a short distance beneath the chassis frame 1 and so that the lower ends of said cylinders are positioned at a point substantially on a level with the housing of the differential mechanism 9. The upper end of each cylinder 15 is closed by an internally threaded cap casing 18 which engages external threads formed on said cylinder and which is provided with an integral boss 19, Figure 12, which is cored to afford an inlet passage 20 and a by-pass passage 21. Communicating with the inlet passage 20 and secured to the boss 19 by means of a packing cap 22 is an inlet pipe 23 which communicates with the pump 10 through a control mechanism to be described hereinafter and which serves to conduct fluid into the interior of the cylinder 15. The lower end of each cylinder 15 is closed by a cap 24 threaded thereon in a manner similar to the cap 18 and provided with a boss 25 which is cored to afford an outlet passage 26 and a by-pass passage 27. An outlet conduit 28 communicates with the outlet passage 26 and is secured to the boss 25 by means of a packing cap 29 in the same manner as the conduit 23 is secured to the boss 19.

Slidably mounted in each of said cylinders 15 is a piston 30 which is suitably packed or provided with washers 31 and 32 to prevent the leakage of fluid therepast. Axially mounted in each cylinder 15 and secured to the piston 30 by means of a nut 33 is a piston rod 34 which extends outwardly through a central aperture in the lower cap 24, a suitable packing 35 being provided around said central aperture to prevent the leakage of fluid therethrough.

A surface contacting base or foot 36 is secured to the lower end of each of the rods 34 on the outside of the cylinder by means of a ball and socket or universal joint which comprises a ball 37 formed on the outer end of said rod 34 and seating in a hemispherical recess in the upper end of said base 36 and being secured in position by means of a member 38 threaded on the upper end of said base and provided with a spherical seat 39 engaging the upper side of said ball 37 and provided with a conical recess 40 allowing movement of said threaded member and base relative to the rod 34 and the ball 37.

From the above described construction, it will be apparent that the introduction of the fluid under pressure through the conduit 23 will force the piston 30 downwardly and consequently will force the rod 34 and the base 36 downwardly and outwardly, thereby lifting the vehicle wheels from the surface on which they are supported. During the downward movement of said piston 30, fluid in the cylinder 15 is forced outwardly through the pipe 28 until the piston passes an opening 41 which is provided in the cylinder near the lower end thereof and which connects with the by-pass 27 through a valved passage 42 which is normally closed by a spring pressed ball check valve 43. As soon as the piston 30 passes said opening 41 the pressure of the fluid in the cylinder will of course open said ball check valve 43 and allow the fluid to continue to escape through the passage 27 and the outlet pipe 28, thus preventing damage to the installation through excessive pressures after the jack has reached its limit of movement.

When it is desired to lower the vehicle wheels to the supporting surface and to return the piston 30 and the base 36 to their normal positions, the flow of the fluid through the system is reversed, the conduit 28 becoming the inlet passage and the conduit 23 becoming the outlet passage. At the time the piston 30 reaches the upper limit of its travel, a pressure relief is afforded by an opening 44 which is provided in the upper end of the cylinder and which communicates with the by-pass passage 21 through a valved passage 45 which is normally closed by a spring pressed ball check valve 46. After the piston 30 has passed the opening 44 in its upward movement, the pressure existing in the system will of course act to open said valve 46 and thus allow the fluid to flow outwardly through the opening 44, the passage 45, the by-pass passage 21, the passage 20, and the conduit 23.

Means are provided whereby the rods 34 may be locked in extended position independent of the fluid pressure in the system and said means comprise pins 47 which are preferably secured to the caps 24 by any suitable flexible means 48 and which are adapted to be engaged through apertures 49 formed in the upper ends of said rods 34, said pins being engaged through said apertures after the rods have been forced to extended position and said apertures are on the outside of the cap 24.

A control mechanism whereby the jacks may be either selectively or simultaneously operated and whereby the same may be locked in a predetermined position is clearly illustrated in Figures 5 to 9 inclusive and will now be described. Said control mechanism comprises in effect a central control valve consisting of an outer cylindrical casing 50 which is provided with outwardly extending externally threaded bosses 51, 52, 53 and 54 which are cored to provide inlet passages communicating with the interior of said casing 50. Positioned diametrically opposite said bosses 51, 52, 53 and 54 are similarly externally threaded bosses 55, 56, 57 and 58 which are similarly cored to afford outlet passages communicating with the interior of the casing 50. An externally threaded axial boss 59 affording a passage 60 communicating with the interior of the casing 50 is provided at the bottom of the casing and offset from said boss 59 is an externally threaded boss 61 which also affords a passage communicating with the interior of the casing 50 and communicating with an annular grooved passage 62 formed in the bottom of said casing. The interior of the casing 50 is cored to afford a frustro-conical recess and rotatably mounted in said recess is a valve core 63, the upper end of which is provided with a boss 64 rotatably mounted in a central aperture in a cover 65 which is threaded in the upper end of the casing 50. The lower end of said core 63 is provided with an axial cylindrical boss 66 which is seated in an axial depression formed in the bottom of the casing. An integral extension 67 of the boss 64 has an operating handle 68 secured thereto and said operating handle 68 is preferably provided with a pointer 69 which coacts with indicia 70 marked or otherwise formed on the cover 65 to indicate to the operator the position into which the handle is to be moved to attain a desired operation. In order that the handle may be properly positioned without a careful examination of the indicia 70 a spring pressed detent 71 is provided in a boss 72 formed on the outer end of the handle 68, and said spring pressed detent is adapted to engage in notches 73 formed in the edge of the cover 65 at points corresponding to various operating positions of said handle. In order that the handle 67 may be locked in neutral position to prevent the extension of the jacks when the same are retracted, or to prevent the retraction of the jacks when the same are extended, the boss 72 is preferably provided with a locking mechanism 73ª of any well-known form having a bolt which is adapted to be engaged in a notch 74 formed in the casing 50 at a point corresponding to the neutral position of the valve. Chambers 75 and 76 are formed in the valve core 63 and communicating with the chamber 75 is a series of diagonally arranged ports 77, 78, 79 and 80 which are adapted to be selectively brought into register with the passages through the bosses 51, 52, 53 and 54 respectively. In order that communication between the chamber 75 and all of the passages leading through the bosses 51, 52, 53 and 54 may be established simultaneously a vertical groove 81 is formed in the wall of the valve core 63 and is provided with an opening 82 communicating with the chamber 75. A similar communication is established between the passages through the bosses 55, 56, 57 and 58 and the interior of the chamber 76 by means of ports 83, 84, 85 and 86 respectively, and by means of a vertical groove 87 and a port 88 similar to the groove and port 81 and 82. An inlet from the pump 10 to the interior of the valve core is provided by a conduit 89, Figure 13, which is connected on the boss 59 and the other end of which is connected to the discharge outlet of said pump 10. The passage 60 in the boss 59 communicates with an axial passage 90 formed in the central portion of the valve core 63, and said axial passage 90 communicates with the chamber 75 through a transverse passage 91 leading from the upper end thereof. The passage through the boss 61 communicates with the groove 62 and has secured thereto a conduit 92 which extends to the intake side of the pump 10 as clearly indicated in Figure 13. The conduits 23 connected to the upper ends of the various jack cylinders 15 extend along and are supported on portions of the vehicle chassis frame 1 and communicate with the control valve, said conduits 23 being connected to the control valve at the bosses 51, 52, 53 and 54. In order to prevent the breaking of said pipes 23 due to vibration or other shocks incident to the operation of the vehicle, flexible connections 93 are preferably provided therein at various points, as clearly indicated in Figures 2 and 3. The conduits 28 in a similar manner act to connect the lower ends of the jack cylinders 15 with the control valve, being connected to said control valve at the bosses 55, 56, 57 and 58, and said pipes 28 are also provided with flexible connections as indicated at 94 in Figures 2 and 3.

A modified construction embodying the principles of this invention is shown in Figures 14 to 16 inclusive, and in this modified form the operating fluid is stored in a tank 95 from which it is withdrawn by the pump 10 through the pipe 104 and pumped outwardly through a conduit 103 and a control valve 97 to the various jacks through conduits 98, 99, 100 and 101. The construction of these jacks is similar to the construction of the jacks heretofore mentioned, with the exception that means are only provided for extending the jacks, or in other words, for forcing the plungers outwardly. When it is desired to lower the vehicle wheels the control valve 97 is manipulated to permit the fluid to be forced out of the jacks through outlets 102 in the upper ends thereof, through a conduit 96 back to the tank 95. This construction of course allows the wheels to be forced downwardly to the supporting surface by the weight of the vehicle, and the bases 36 and the plungers inside the cylinders 15 are returned to their normal position by a construction which is illustrated in Figure 16 and which will now be described. In this construction a lower cap 105 is substituted on each of the cylinders 15 for the lower cap 24 and said caps 105 are each provided with an integral flange 106 having apertures through which elongated bolts 107 are slidingly engaged. The lower ends of said bolts 107 are secured to a spider 108 which in turn is secured to the rod 34 so that said bolts 107 are moved downwardly through the apertures in the flange 106 when the rod 34 is moved outwardly by the pressure of the fluid in the cylinder. This downward movement of the bolts 107 acts to compress helical springs 109 engaged therearound between the inner faces of the heads thereof and the upper side of the flange 106, and it will be apparent that when the pressure of the fluid is released these springs will act to return the spider 108 and the rod 34 attached thereto to their normal position, thus lifting the base 36 of the jack from the supporting surface upwardly to a position where it will sufficiently clear said surface. An automatic releasing mechanism is provided to prevent damage due to excessive pressure resulting from the operator's allowing the pump to be continued in operation after the jacks of the type shown in Figure 16 are extended. This automatic releasing mechanism is shown in detail in Figure 14 and comprises a series of cylinders 110 which are connected in the conduits 98, 99, 100 and 101 respectively, and each of which is closed at its outer end by a threaded cap 111. Slidably mounted in each of said cylinders 110 is a piston 112 which is normally held adjacent the inner end of the cylinder by means of a helical spring 113 and which is provided with a piston rod 114 extending outwardly through the cap 111 and connected to one arm of a bell-crank lever 115 which is pivoted on the outer end of a fixed bracket 116. Connected to the other arm of said bell-crank lever 115 is a link 116ª which extends to an operating handle 117 connected to the clutch 13 so that when the pressure in the cylinder 110 becomes excessive and the piston 112 therein is moved outwardly against the action of the spring 113, the motion of said piston is transmitted through the piston rod 114, the bell-crank lever 115, the link 116, and the clutch lever 117, to disengage the clutch 13 and stop the operation of the pump 10.

The operation is as follows:

When it is desired to raise any one of the vehicle wheels from the supporting surface, the control handle 68 is unlocked and moved so that the indicator 69 thereon points to the particular indicia 70 on the cover 65 which indicates the wheel which is to be raised. This causes a proper adjustment of the control valve to bring say the port 77 into register with the passage through the boss 51 and also brings the port 83 into register with the passage through the boss 55. The pump 10 is then set in operation by connecting the clutch 13 through the handle 14 and liquid flows inwardly through the conduit 89 into the passage 60, through the passages 90 and 91 into the chamber 75, and from said chamber 75 outwardly through the port 77 and the passage in the boss 51 and through its conduit 23 to the interior of the vertical cylinder 15 to which it is connected. The entrance of this fluid under pressure causes an outward movement of the piston 30 in said cylinder 15, the fluid in the lower part of said cylinder being forced outwardly therefrom through its conduit 28, through the passage in the boss 55, and through the port 83, to the interior of the chamber 76, thence outwardly through the passage in the boss 61 to the conduit 92 and back to the pump 10. The system being entirely filled with fluid, the outward movement of the piston and of the base 36 may be stopped at any time by moving the valve to neutral position, thus closing the ports 77 and 83 and preventing further circulation of the fluid. The movement of the valve to neutral position should of course be accompanied by a disengagement of the clutch 13 through manipulation of the lever or handle 14. In case the piston 30 is moved to its extreme extended position, a pressure release through the ball check valve 43 will take place in the manner heretofore described. When it is desired to lower the vehicle wheel the control handle 68 is rotated through 180 degrees to release position, bringing the passages 90 and 91 and the chamber 75 into communication with the passage through the boss 55 and bringing the chamber 76 into communication with the passage through the boss 51. This causes a reverse action and allows the vehicle wheel to be lowered, an automatic release being effected when the piston 30 has reached the upper limit of its travel, by means of the ball check valve 46. In case it is desired to raise any of the other vehicle wheels from the supporting surface it is only necessary to move the control handle 68 to the proper position, whereupon a similar action both upon raising and upon lowering will take place. In case it is desired to raise all of the vehicle wheels simultaneously it is only necessary to so adjust the control handle 68 as to bring the groove 81 and the passage 82, and the groove 87 and the passage 88, into communication with the passages through the bosses 51, 52, 53 and 54, and the passages through the bosses 55, 56, 57 and 58, respectively, whereupon fluid will be forced outwardly through all of the conduits 23 and be returned through all of the conduits 28. It might be noted that when the valve core 63 is moved into position to effect the release or lowering of the jacks, that communication from the chamber 76 to the passage through the boss 61 is provided by the groove 62.

A somewhat similar operation is effected in the use of the modified form of lifting means shown in Figures 14 to 16 inclusive, except that in this case the fluid under pressure is transmitted to the pistons and returned therefrom when the pressure is released through the same conduits, that is, conduits 98, 99, 100 and 101, respectively. In this modified system also the weight of the vehicle and the action of the springs 109 is instrumental in returning the pistons and the bases to their normal inoperative position because of the mechanical operation through the fluid pressure created by the operation of the pump 10.

In the system shown in Figures 1 to 13 inclusive, all of the conduits and the pump are at all times substantially filled with fluid, while in the system shown in Figures 14 to 16 inclusive, the fluid supply is maintained in the tank 95, the fluid when used being pumped out of said tank and forced against the pistons by the operation of the pump.

Any suitable fluid such as lubricating oil, water, or various compositions may be used in the systems of this invention; and it will also be apparent that a manually operated system of creating fluid pressure might be readily substituted for the mechanically operated pump 10.

The provision of the ball and socket connections between the outer ends of the rods 34 and the bases or surface contacting feet 36 affords a construction whereby the surface engaged by the jack is properly contacted to transmit the pressure to the rods 34 without undue strain on the mechanisms associated therewith.

It will be apparent from the foregoing specification that this invention provides a convenient means for elevating one or a plurality of the vehicle wheels from a supporting surface; and it will also be apparent that the operation of this means may be readily effected by the driver of the vehicle without leaving the driving position.

The system may be economically constructed and conveniently installed and is readily adapted to be used either as an accessory for existing types of vehicles, or as an integral part of vehicles to be constructed.

We are aware that numerous details of construction may be varied through a wide range without departing from the principles of this invention, and we therefore do not purpose limiting the patent granted otherwise than necessitated by the prior art.

We claim as our invention:

1. The combination with a vehicle, of a series of hydraulic jacks for raising the wheels thereof, and a single selective control means for said jacks, permitting simultaneous or selective operation thereof.

2. The combination with a motor vehicle including the transmission mechanism thereof, of a plurality of jacks mounted on the vehicle, a mechanism operatively connected with the transmission mechanism for operating said jacks, and a single controlling means for said mechanism permitting simultaneous or selective operation of the jacks.

3. The combination with a vehicle, of means for pumping a fluid mounted thereon, a plurality of jacks for raising the vehicle, mechanisms for operating said jacks actuated by the fluid pumped by said means, and a single means for controlling the flow of the fluid to permit simultaneous or selective operation of the jacks.

4. The combination with a vehicle, of means for pumping a fluid mounted thereon, a plurality of jacks for raising the vehicle, mechanisms for operating said jacks actuated by the fluid pumped by said means, and a single selective valve mechanism for controlling the flow of the fluid.

5. The combination with a vehicle, of a plurality of jacks mounted thereon for raising the vehicle, a hydraulic mechanism associated with each jack for operating the same, a power mechanism for actuating said hydraulic mechanism, conduits between said power mechanisms and the hydraulic mechanisms, and a rotary valve mechanism for selectively controlling the flow of fluid through said conduits.

6. The combination with a vehicle, of a plurality of cylinders secured to the axles thereof, a piston in each cylinder, a rod including a base at its outer end secured to each piston and extending through the lower end of its cylinder, means on the vehicle for forcing a fluid into each cylinder to cause the pistons therein to move in either direction, and a single means for controlling the flow of fluid to permit simultaneous or selective operation of the jacks.

In testimony whereof, we have hereunto subscribed our names in the presence of two subscribing witnesses.

WILLIAM G. CHAPPELL.
RICHARD S. CHAPPELL.
SYDNEY C. SMITH.

Witnesses:
L. I. COON,
GUY G. JORDAN.